United States Patent [19]

Okubo et al.

[11] Patent Number: 5,048,227

[45] Date of Patent: Sep. 17, 1991

[54] **METHOD OF CULTIVATING *AGARICUS BLAZEI* MUSHROOM**

[76] Inventors: Junya Okubo, 1-1-3 Koganemachi, Kokurakita-ku, Kitakyushu-shi, Fukuoka; Kazukuni Kuramoto, 2-8-9 Tamachi, Yahatanishi-ku, Kitakyushu-shi, Fukuoka; Shinji Ohkubo, 2-5-5-103 Yokoyama, Sagamihara-shi, Kanagawa, all of Japan

[21] Appl. No.: 347,747

[22] Filed: May 4, 1989

[30] Foreign Application Priority Data

May 5, 1988 [JP] Japan .................. 63-109137
Dec. 23, 1988 [JP] Japan .................. 63-223695

[51] Int. Cl.$^5$ .............................. A01G 1/04
[52] U.S. Cl. ......................................... 47/1.1
[58] Field of Search ................................ 47/1.1

[56] References Cited

U.S. PATENT DOCUMENTS 1,694,482 12/1928 Morris ............................ 47/1.1
4,443,969 4/1984 Hanacek et al. ................. 47/1.1

FOREIGN PATENT DOCUMENTS 2443798 8/1980 France ........................... 47/1.1
138853 12/1978 Japan ............................. 47/1.1
60-69026 4/1985 Japan ............................. 47/1.1

OTHER PUBLICATIONS

Buckman, H. O. et al. "Table 3.1. The Classification of Soils According to Two Systems" *The Nature and Properties of Soild* 7th Ed. The MacMillan Co. 1969 p. 43.
Schroeder, M. E. (1986) "Outwitting Biological Heat Patterns" *Agricultural Engineering*, May/Jun. 1986, pp. 18–19.
Edwards, R. L. "Chapter 12: Growing in Houses" *The Biology and Cultivation of Edible Mushrooms* (Chang et al. Eds.) Academic Press, N.Y., 1978, pp. 299–336.

Primary Examiner—James R. Feyrer
Attorney, Agent, or Firm—Michael N. Meller

[57] ABSTRACT

An artificial cultivation method of *Agaricus blazei*, i.e., edible basidiomycetes which grow wild in fields and mountains in the São José do Rio Prêto district located northwestward of São Paulo city, Brazil. The optimum cultivation conditions have been established by studying the form of development of the *Agaricus blazei* and also the method has been completed with a view to reducing the harvesting period and increasing the yield.

12 Claims, 1 Drawing Sheet

METHOD OF CULTIVATING *AGARICUS BLAZEI* MUSHROOM

BACKGROUND OF THE INVENTION

1. Field of the Invention

The present invention relates to a method of cultivating an Agaricus mushroom and more particularly *Agaricus blazei*.

The basidiomycetes used in the invention are the *Agaricus blazei* and they are hereinafter simply referred to as "the *blazei* mushrooms". The present basidiomycetes or the *blazei* mushrooms grow naturally in the fields and mountains of the São José do Rio Prêto district located northwestwards of São Paulo city, Brazil and these basidiomycetes are eaten widely in the district.

The properties of the fruit body of the basidiomycete used in this embodiment will now be described.

The fruit body is formed into a conical shape (bell shaped) and includes a pileus whose external surface color is brown and a stipe having a white or milk-white color. The pileus grows to a size of 5 to 10 cm and the stipe grows to a size of up to 15 cm at the maximum. The edge and inner surface of the pileus are formed into conical shape and its radiating gills from a curled edge. The stipe is centrally attached, formed into a uniform diametral shape (the root is buldged) and has its surface formed into a conical shape with a white bloo, on it. The fruit bodies grow in a scattered manner. Also, the dried fleshly part tastes sweet more or less and delicious.

It is well known that the fungi belonging to the same genus as the present basidiomycetes or the *blazei* mushrooms include *Agaricus bisporus* which have been cultivated commercially and generally known and sold in the name of "mushroom" and they are hereinafter simply referred to as mushrooms.

The commercial cultivating method of the mushrooms is to inoculate spawns of the match-box size which are arranged at intervals of about 30 cm in a fungus nursery made of a compost or the like. The cultivation is effected at a temperature of 18° to 22° C. and humidity of 60 to 70% and the spawns are covered up with soil on the 10th day or so after the inoculation of the spawns. When this occurs, a thick bed of aggregated fungi (fungus aggregation bed) is formed at the boundary between the fungus nursery and the covering-up soil and fruit bodies grow from the bed. The optimum thickness of the covering-up solid has been considered to be between 2.5 and 3 cm with the result that greater thicknesses excessively reduce the development of fruit bodies and the developed fruit bodies have elongated stalks thus making them workless commercially.

However, the *blazei* mushroom used in this invention are cultivated by a method which is entirely different from the cultivation method of the mushrooms of the same genus. In other words, the inventors have found out a number of differences in the form of development between the *blazei* mushrooms of this invention and the mushrooms of the same genus and also the form of development of the *blazei* mushrooms has been studies thereby establishing the optimum cultivation conditions. In addition, research works have been carried out earnestly with a view to reducing the period of time required for harvesting and increasing the yield thereby discovering the invention.

SUMMARY OF THE INVENTION

It is a first object of the present invention to provide an Agaricus mushroom cultivation method of the type comprising inoculating a plurality of spawns in a fungus nursery made of a compost, implanting fungi onto the fungus nursery and covering up the fungus nursery with soil thereby causing fruit bodies to develop, wherein the cultivation temperature and humidity are respectively set to 20° C. or over and 85 to 95% and the thickness of the covering-up soil is selected to range from 4 cm through 6 cm.

It is another object of the invention to provide an Agaricus mushroom cultivation method of the type comprising inoculating a plurality of spawns in a fungus nursery made of a compost, implanting fungi onto the fungus nursery and covering up the fungus nursery with soil thereby causing fruit bodies to develop, wherein during the elongation period of the fruit bodies (fruit body elongation period) the difference in cultivation temperature between day and night is selected to be at least 3° C. or over.

It is a third object of the invention to provide an Agaricus mushroom cultivation method of the type comprising inoculating a plurality of spawns in a fungus nursery, implanting fungi onto the fungus nursery and covering up the fungus nursery with soil thereby causing fruit bodies to develop, wherein obstacles are buried at the position of a fungus aggregation bed of the Agaricus mushroom fungi which is formed in the covering-up soil.

More specifically, in accordance with new knowledge of the inventors, the cultivation conditions of the Agaricus mushroom or the *blazei* mushroom according to the invention specify a temperature range of 20° to 30° C., preferably 28° C. and a humidity range of 80 to 95%, preferably 95%. Where spawns are inoculated in a compost and the spawns are covered up with soil after the full implantation of fungi, the fungi form a fungus aggregation bed in the portion of 4 cm above the compost and then fruit bodies are formed from the bed. This represents a form of generation which cannot be seen in the case of the mushrooms of the same genus and also the propagation of fungi as such takes place without the formation of any fruit body if the temperature during the formation of fruit bodies is 20° or less.

Moreover, by selecting the difference in cultivation temperature between day and night at least 3° C. or over, preferably 3° to 5° C. during the fruit body elongation period, the formation of fully solid fruit bodies is ensured.

Also, since the *blazei* mushrooms form a fungus aggregation bed in the covering-up soil above the compost surface, by burying obstacles at the position of the fungus aggregation bed, the fungus aggregation bed is increased in thickness along the obstacles. Thus, the formation of fruit bodies from the thickened fungus aggregation bed is promoted.

In accordance with the present invention, the optimum cultivation method of *blazei* mushrooms is established thus making it possible to form fully solid fruit bodies by effectively utilizing the compost of a fungus nursery and also the fact that the *blazei* mushrooms form a fungus aggregation bed in the covering-up soil above the compost surface has the effect of increasing the thickness of the fungus aggregation bed along obstacles, buried at the position of the fungus aggregation bed. Thus, there is the resulting effect of promoting the formation of fruit bodies from the fungus aggregation bed, reducing the cultivation period and increasing the yield of fruit bodies.

DESCRIPTION OF THE PREFERRED EMBODIMENTS

(1) Fungus Aggregation Bed Test

Figure 1:
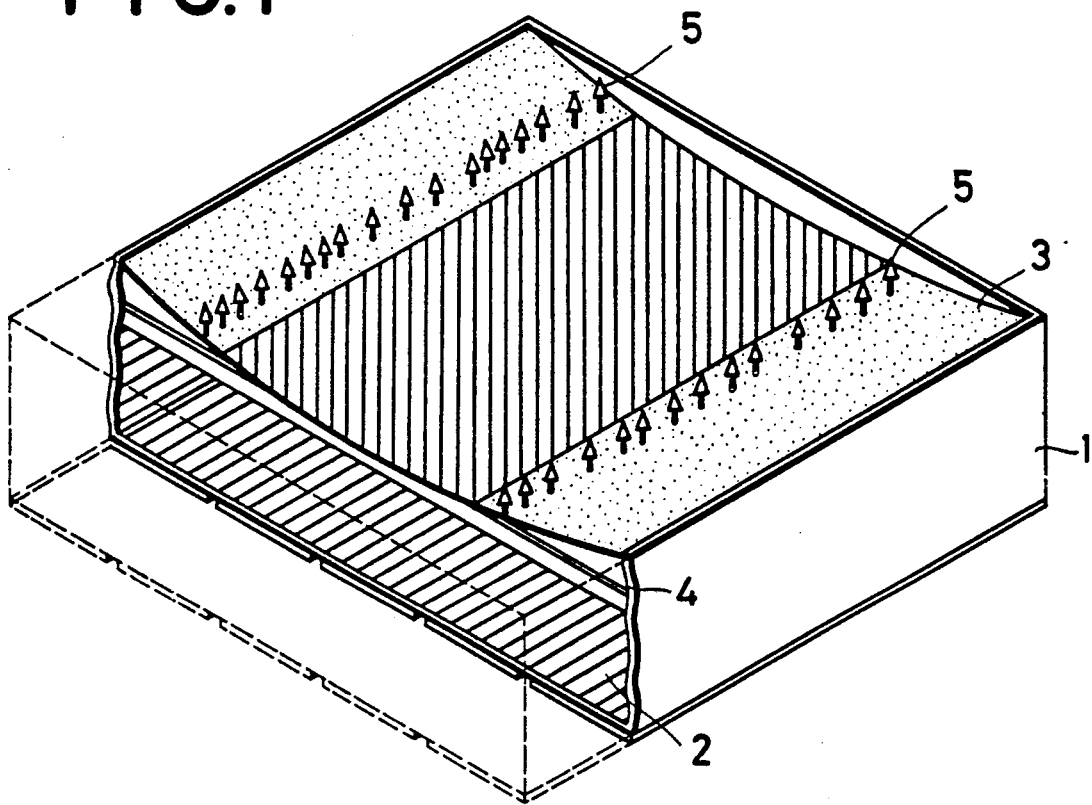
FIG. 1 is a perspective view of a fungus nursery frame used in a fungus aggregation bed test showing a part thereof in section.

FIG. 1 is a perspective view of the fungus nursery used showing a part thereof in section. A compost 2 was filled to a depth of 20 cm into a fungus nursery 1 composed of a wooden frame which was 100 cm × 100 cm in size and 30 cm in depth and spawns were spread and inoculated all over the nursery surface. The cultivation was effected with a cultivation temperature of 25° C. and humidity of 85 to 95% and, after confirming the propagation of fungi all over the surface on the 20th day after the inoculation, the spawns were covered up with sandy soil 3 of less than 3 mm in particle diameter. At this time, the covering-up soil was placed in a concave manner longitudinally so that the central portion was depressed in section as shown in FIG. 1. The lowest portion at the center had a depth of 3 cm and the highest portion at each end had a depth of 10 cm. On around the 35th day or so after the covering up, fruit bodies 5 were formed in longitudinal rows in the portion of 4.5 to 5.5 cm above the compost surface.

Looking in section, it was seen that as shown in FIG. 1, a fungus aggregation bed 4 was formed at the location of 4 cm above the compost surface over the whole surface and the fruit bodies 5 were formed in the portion where the thickness of the covering-up soil from the fungus aggregation bed 4 was 1 cm. From this it was confirmed that the optimum thickness of the covering-up soil from the compost surface was 5 cm.

(2) Optimum Temperature and Humidity

A plurality of fungus nurseries each composed of a wooden frame of 100 cm × 100 cm in size and 30 cm in depth as in the case of the above-described fungus aggregation bed test were prepared and each of the fungus nurseries was filled with a compost to a depth of 20 cm and spawns were applied and inoculated all over the surface. The cultivation was effected in the like manner by setting the cultivation room humidity to 80% and the cultivation temperature to 18° C., 20° C., 24° C., 26° C., 28° C. and 30° C., respectively. At the expiration of 20 days after the inoculation, no remarkable difference was seen in the growth of fungi among the fungus nurseries and the uniform implantation of the fungi was confirmed all over the surface.

In the case where the covering-up soil comprising sandy soil of less than 3 mm in particle diameter was laid to a depth of 5 cm all over the surface of each of the fungus nurseries and the cultivation was continued under the previously mentioned conditions, the development of fruit bodies was first confirmed in the fungus nursery of 28° C. on the 25th day after the covering up. The development of fruit bodies was similarly confirmed in the fungus nurseries of 26° C. and 30° C., respectively, on the 35th day after the covering up. The development of fruit bodies was confirmed in the fungus nursery of 20° C. on the 60th day after the covering up. However, the development of any fruit bodies was not confirmed at 18° C. and it was confirmed that the digestion of the compost proceeded in the state of fungi.

Then, in the fungus nursery of 28° C., the development of fruit bodies was remarkable in the vicinity of a humidifier for maintaining constant the humidity inside the cultivation room and the humidity measured was 95%. On the other hand, the development of fruit bodies did not take place in such places where there always was the falling of water drops and therefore the optimum humidity was confirmed 80 to 95%, preferably 95%.

(3) Solidness of Fruit Bodies

When the temperature difference between day and night was maintained constant during the fruit body elongation period, fruit bodies having elongated stipes were formed. Thus, the temperature difference between day and night was varied. When the daytime cultivation temperature was set to 28° C. and the nighttime cultivation temperature was set to 23° C., fruit bodies having thick and solid stipes were produced.

In the case of the fungus nursery satisfying the optimum conditions including the above-mentioned three conditions, the development of fruit bodies occurred at the expiration for 47 days after the inoculation and they were gathered in at the lapse of about 52 days. Also, the second fruit bodies were developed at the expiration of about 10 days after the harvesting and similarly the third and fourth fruit bodies were developed.

By using the cultivation method according to the invention, fruit bodies of over 10 kg in total were harvested in six months from a fungus nursery employing a wooden frame of the previously mentioned size.

(4) Cultivation Test of Lattice Frame

Figure 2:
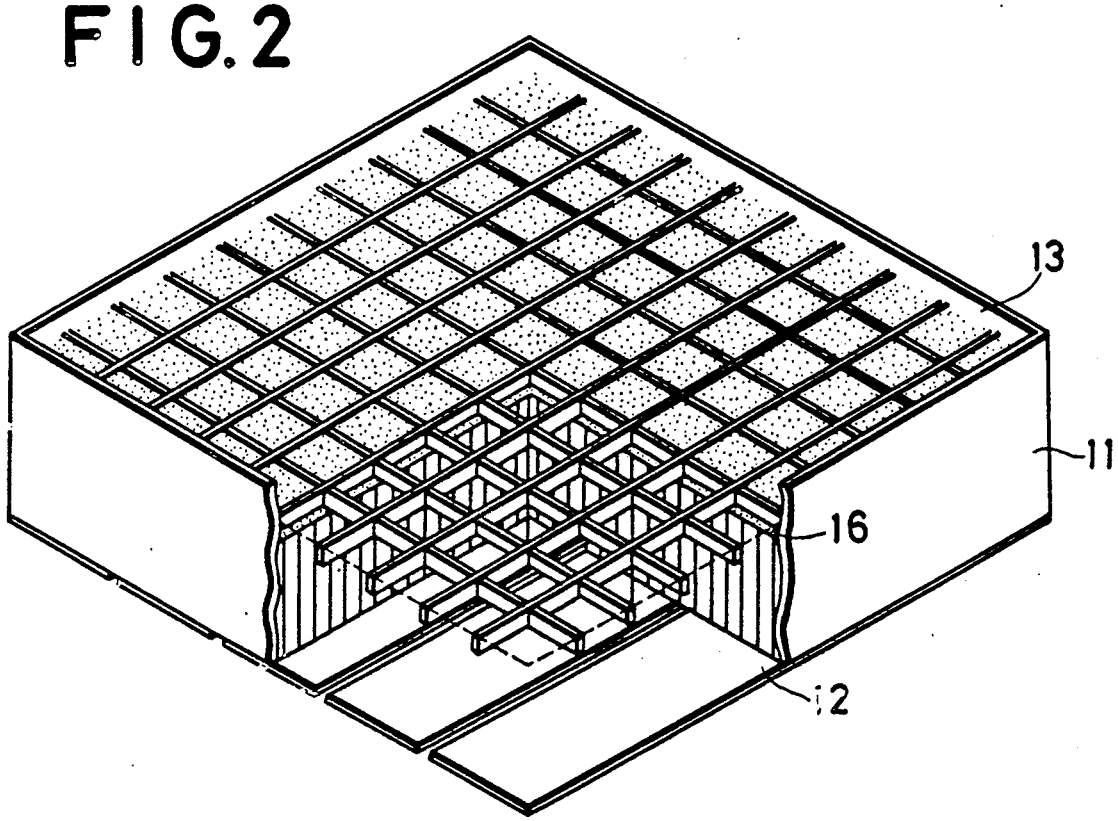
FIG. 2 is a perspective view of a fungus nursery frame using a lattice frame showing a part thereof in section.

FIG. 2 is a perspective view of a fungus nursery employing a lattice frame showing a part thereof in section.

Using six fungus nursery frames 11 each composed of a wooden frame of 100 cm × 100 cm in size and 30 cm in depth as in the case of the previously mentioned fungus nursery frame, a compost 12 was filled to a depth of 20 cm and spawns were spread and inoculated all over the surface of each fungus nursery. The cultivation was effected as previously by setting the cultivation room temperature and humidity to 26° C. and 90%, respectively. At the expiration of 20 days after the inoculation, the implantation of fungi all over the compost 12 in each frame was confirmed. At this time, no difference in growth among the fungi was confirmed.

At this point, covering-up soil 13 composed of sandy soil of less than 3 mm in particle diameter was laid to a thickness of 5 cm all over the surface in each of the fungus nursery frames 11.

At this time, as working examples, lattice frames 16 each having a size of 10 cm × 10 cm and a thickness of 3 cm were buried along the surface within each of the three fungus nursery frames 11 as shown in FIG. 2.

As comparative examples, the cultivation of each of the other three fungus necessary frames 11 was continued under the same conditions without burying any lattice frames 16.

Comparisons were made between the working-example and comparative example fungus nursery frames 11 with respect to the number of elapsed days until the day of formation of the first-stage fruit bodies and the weight of gathered product as well as the numbers of days until the formation of the second-, third- and fourth-stage fruit bodies and the weights of gathered products under the same conditions.

On the 24th to 26th day after the covering up, the first-stage fruit bodies were developed along the lattice frames and 12.0 kg of the fruit bodies grown to the suitable size were harvested in total. The cultivation was continued under the same conditions with the result that the second-stage fruit bodies were similarly developed along the lattice frames 16 on the 33rd to 35th day after the covering up and 11.4 kg of the fruit bodies were harvested in total. Similarly, the third- and fourth-stage fruit bodies were gathered in.

The results of comparisons between the working examples and the comparative examples are shown in the following Table 1.

TABLE 1

|  |  | First Stage | Second Stage | Third Stage | Fourth Stage | Total |
|---|---|---|---|---|---|---|
| Working examples | No. of elapsed days* | 24–26 | 33–35 | 42–55 | 52–55 | 46.5 kg/ 55 days |
|  | Weight of harvested product** | 12.0 kg | 11.4 kg | 11.7 kg | 11.4 kg |  |
| Comparative examples | No. of elapsed days | 34–37 | 43–47 | 54–58 | 65–69 | 33.9 kg/ 66 days |
|  | Weight of harvested product | 9.3 kg | 8.4 kg | 8.1 kg | 8.1 kg |  |

*No. of elapsed days represents the number of days after the overing up or the number of days at the time of harvesting of the fruit bodies.
**Weight of harvested product represents the total weight of the product from the three fungus nursery frames in both cases of the working and comparative examples.

The foregoing results show that finally the harvest was made earlier by 11 days and the yield was about 1.4 times as compared with the case where no lattice frames 16 were buried.

While the present embodiment has been applied to the *blazei* mushrooms, the basidiomycetes used only need to be such that a fungus aggregation bed is formed in the portion of the covering-up soil above the compost surface. Also, while, in the above-described embodiment, lattice-shaped obstacles are buried in the covering-up soil, any obstacles of far shape, spherical shape or the like may be used provided that they increase the thickness of a fungus aggregation bed for the Agaricus mushroom fungi which is to be formed in the covering-up soil.

What is claimed is:

1. In a method of producing fruit bodies of an edible mushroom comprising the steps of inoculating in a plurality of locations with a spawn of *Agaricus blazei* onto a compost bed, allowing the spawn to run on the compost bed, and then casing the compost bed with casing soil, thereby causing the fruit bodies to be produced, the improvement wherein said casing covers the surface of the compost bed, and at least one obstacle is buried underneath the top surface of said casing soil and placed at a position of a spawn aggregation layer of the *Agaricus blazei* which is formed above the surface of said compost bed in said casing soil.

2. A method of producing fruit bodies of an edible mushroom according to claim 1, wherein at least one obstacle is composed of a frame assembled in a lattice form.

3. A method of producing fruit bodies of an edible mushroom according to claim 2, wherein the producing temperature of the compost bed and the atmosphere surrounding the compost bed is maintained at least at 28° C., an the humidity of the atmosphere surrounding the compost bed is maintained at 95%.

4. A method of producing fruit bodies of an edible mushroom according to claim 3, wherein said casing covers the entire top surface of the compost bed so that the casing soil is laid uniformly to have a thickness of 5 cm, and wherein said at least one obstacle has a thickness of 3 cm.

5. A method of producing fruit bodies of an edible mushroom according to claim 1, wherein the temperature of the compost bed and the atmosphere surrounding the compost bed is maintained at least at 20° C., the humidity of the atmosphere surrounding the compost bed is maintained at between 85 to 95%, and said casing covers at least the top surface of the compost bed having a thickness of 4 to 6 cm.

6. A method of producing fruit bodies of an edible mushroom according to claim 1, wherein the temperature of the atmosphere surrounding the compost bed is varied by at least 3° C. between daytime and nighttime.

7. A method of producing fruit bodies of an edible mushroom comprising the steps of inoculating a compost bed in a plurality of locations with a spawn of *Agaricus blazei*, allowing the spawn to run on the compost bed, casing at least the top surface of the compost bed with casing soil to a level of between 4 and 6 cm after the full implantation of fungi, and then maintaining the temperature of the compost bed and the atmosphere external to the compost bed at a level of at least 28° C. with an environmental humidity of 85 to 95%, thereby causing the fruit bodies to be produced.

8. A method of producing fruit bodies of an *Agaricus blazei* according to claim 7, wherein said producing humidity is 95%.

9. A method of producing fruit bodies of an *Agaricus blazei* according to claim 7, wherein said casing soil is laid uniformly to a depth of 5 cm all over the surface of the compost bed.

10. A method of producing fruit bodies of an *Agaricus blazei* according to claim 7, wherein said casing soil is composed of sandy soil of up to 2 mm in particle diameter.

11. A method of producing fruit bodies of an edible mushroom comprising the steps of inoculating a compost bed in a plurality of locations with a spawn of *Agaricus blazei*, allowing the spawn to run on the compost bed, casing at least the top surface of the compost bed with casing soil to a level of between 4 and 6 cm after the full implantation of fungi, maintaining the full temperature of the compost bed and the atmosphere external to the compost bed at a level of at least 28° C. with an environmental humidity of 85 to 95%, and controlling the temperature of the atmosphere surrounding the compost bed so that the difference in the temperature between daytime and nighttime is varied by at least 3° C., thereby causing the fruit bodies to be produced.

12. A method of producing fruit bodies of an *Agaricus blazei* according to claim 11, wherein the humidity is set to about 95%, the casing covers the surface of the compost bed with sandy soil of up to 2 mm in particle diameter, and the casing soil is laid uniformly to have a thickness of 5 cm.

* * * * *